: US009526262B2

United States Patent
van der Vegt et al.

(10) Patent No.: US 9,526,262 B2
(45) Date of Patent: Dec. 27, 2016

(54) SWEET PARTICULATE FAT-CONTAINING POWDER, ITS PREPARATION AND ITS USE

(75) Inventors: Albert van der Vegt, Veenhuizen (NL); Hendrik Jan Bisschop, Zuidwolde (NL)

(73) Assignee: Friesland Brands B.V., Amersfoort (NL)

( * ) Notice: Subject to any disclaimer, the term of this patent is extended or adjusted under 35 U.S.C. 154(b) by 378 days.

(21) Appl. No.: 13/879,017

(22) PCT Filed: Oct. 11, 2011

(86) PCT No.: PCT/NL2011/050690
§ 371 (c)(1),
(2), (4) Date: Jun. 24, 2013

(87) PCT Pub. No.: WO2012/050439
PCT Pub. Date: Apr. 19, 2012

(65) Prior Publication Data
US 2013/0266718 A1   Oct. 10, 2013

(30) Foreign Application Priority Data

Oct. 11, 2010  (NL) .................................. 2005496

(51) Int. Cl.
*A23C 1/04* (2006.01)
*A23L 1/00* (2006.01)
(Continued)

(52) U.S. Cl.
CPC ................ *A23C 1/045* (2013.01); *A23C 1/04* (2013.01); *A23C 11/00* (2013.01); *A23L 1/0035* (2013.01);
(Continued)

(58) Field of Classification Search
CPC .. A61K 9/0004; A61K 45/06; A61K 31/4706; A61K 31/401; A61K 31/40; A61K 9/5084; A61K 9/4808; A61K 9/1694; A23C 1/04; A23C 11/00; A23C 1/045; A23L 1/19; A23L 1/0035
(Continued)

(56) References Cited

U.S. PATENT DOCUMENTS 3,414,980 A  * 12/1968  Nezbed ........................... 34/339
3,764,711 A    10/1973  Melnychyn et al.
(Continued)

FOREIGN PATENT DOCUMENTS

| EP | 0 387 950 A1 | 9/1990 |
| EP | 1-074-181 A1 | 2/2001 |
| WO | WO-02/06538 A1 | 1/2002 |

OTHER PUBLICATIONS

International Preliminary Report on Patentability in PCT/NL2011/050690 dated Sep. 17, 2012.
(Continued)

*Primary Examiner* — Erik Kashnikow
*Assistant Examiner* — Assaf Zilbering
(74) *Attorney, Agent, or Firm* — Foley & Lardner LLP; Sunit Talapatra

(57) ABSTRACT

The present invention relates to powders comprising, based on dry weight: (a) 25-75 wt. % carbohydrates, including at least 50% sucrose by weight of said carbohydrates; (b) 10-70 wt. % fat; and (c) 0.4-20 wt % protein; wherein the powder comprise an amorphous matrix of fat, protein and carbohydrates as well as sucrose crystallites embedded therein; and wherein at least 40% of the sucrose is present in crystalline form. Processes of preparing the powders are also provided, comprising: (a) providing a dispersion comprising fat, carbohydrate, protein and water, and having a dry solids content of 50-75 wt. %; (b) providing a finely divided particulate sucrose; and (c) spray drying the dispersion into
(Continued)

a spray drier while continuously introducing the finely divided particulate sucrose into the spray drier in an amount of at least between 40 and 80 wt. % based on the total weight of carbohydrates in the final spray dried product.

8 Claims, 4 Drawing Sheets

(51) Int. Cl.
    *A23D 7/00*     (2006.01)
    *A23D 9/00*     (2006.01)
    *A23J 1/00*     (2006.01)
    *B65B 29/02*     (2006.01)
    *C12H 1/04*     (2006.01)
    *A23C 11/00*     (2006.01)
    *A23L 1/19*     (2006.01)
    *B01J 2/04*     (2006.01)

(52) U.S. Cl.
    CPC .. *A23L 1/19* (2013.01); *A23L 9/20* (2016.08); *A23P 10/40* (2016.08); *B01J 2/04* (2013.01)

(58) Field of Classification Search
    USPC ........ 426/289, 609, 656, 471; 239/398, 419; 159/4.06
    See application file for complete search history.

(56) References Cited

U.S. PATENT DOCUMENTS 4,438,147 A     3/1984     Hedrick, Jr.
2004/0156979 A1     8/2004     Villagran et al.

OTHER PUBLICATIONS

International Search Report in PCT/NL2011/050690 dated Nov. 30, 2011.
Tamime, A. "Dairy Powders and Concentrated Milk Products", Dairy Science and Technology Consultant, 2009, Wiley-Blackwell A John Wiley & Sons, Ltd., Publication, Chapter 8.

\* cited by examiner

P = Dry Powder
E = Emulsion

200 μm

500 μm

SWEET PARTICULATE FAT-CONTAINING POWDER, ITS PREPARATION AND ITS USE

CROSS-REFERENCE TO RELATED APPLICATIONS

This application is a National Phase of International Application PCT/NL2011/050690, filed Oct. 11, 2011, which was published on Apr. 19, 2012, as WO 2012/050439 A1, which claims the benefit of NL Appln No. 2005496, filed Oct. 11, 2010, all of which are incorporated herein by reference in their entirety.

FIELD OF THE INVENTION

The invention pertains to instant foamers, creamers and topping bases, for use in cold or hot water- or milk-based foodstuffs, such as coffee drinks, e.g. cappuccino, desserts.

BACKGROUND DESCRIPTION

Foamers, creamers and topping bases may be described as fat-containing powders. Examples are beverage creamers for e.g. coffee or tea, also known as coffee or tea whiteners; beverage foamers such as cappuccino foamers; and topping bases, which can be used to prepare whipped food products, such as whipped desserts.

These kinds of ingredients contain fats, proteins and carbohydrates in application-specific pre-determined amounts. An overview is given by A. Tamime, "*Dairy powders and concentrated milk products*," (2009), Chapter 8. There, it is mentioned that the carbohydrate component can be formulated from glucose syrups, maltodextrins and sucrose, with proportions adjusted to target a specific sweetness level (page 271).

However, in the art, the use of sucrose in high amounts is typically avoided because of its known hygroscopicity. Due to this hygroscopic behavior, sucrose causes lumping during processing, and stoppage of the spray-drier. Also, high amounts of sucrose could readily yield the spray-dried powder with an unattractive sticky and caking appearance. In the art, the preferred bulking agents are therefore selected from corn syrup solids, maltodextrin and various dextrose equivalents, starches, and mixtures thereof. Corn syrups are particularly preferred bulking agents because of their cost and processability. Non-limiting examples are provided in US 2004/0156979, EP 1.074.181, U.S. Pat. No. 4,438,147, their contents herein incorporated by reference.

U.S. Pat. No. 3,414,980 describes a process for preparing a dry topping mix which comprises in combination the steps of mixing the desired ingredients including a portion of the total amount of sweetening agent to form a liquid dispersion, spraying said liquid dispersion into a drying chamber, introducing the remaining portion of the sweetening agent in a substantially dry state into said drying chamber resulting in admixture of said sprayed liquid dispersion and said remaining portion of said sweetening agent and drying said admixture to provide a dry homogeneous topping composition.

Examples I to III of U.S. Pat. No. 3,414,980 describe the preparation of a dry topping mix by spraying a liquid dispersion containing 27.4 wt. % hydrogenated coconut oil; 28.4 wt. % sweetening agent (20 wt. % sugar and 8.4 wt. % corn syrup solids); 4.2 wt. % caseinate; 7.5 wt. % emulsifier and 30 wt. % water and concurrently introducing dry granular sugar. In Example I of U.S. Pat. No. 3,414,980 dry granular sugar was metered to provide 16.5 wt. % of the total sweetening agent, resulting in a dry topping composition containing 48.7 percent sugar. In Example III dry granular sugar was metered at a rate to provide 6 wt. % of total sugar in the dry topping mix, resulting in a mix containing 42.4 by weight of total sugar.

In Example II the preparation of a dry topping mix containing 43.8 wt. % sweetening agent is described. In Example II it is stated that dry granular sugar was metered at a rate so as to provide 80 wt. % of the total sweetening agent in the dry topping mix. However, it can be calculated that in order to prepare a dry topping mix containing 43.8 wt. % sweetening agent, dry granular sugar must be metered at 8.0 wt. % and not at 80 wt. % of the total sweetening agent. In column 4, lines 26-29 of U.S. Pat. No. 3,414,980 it is observed that the total amount of sweetening agent in a dry topping mix varies from about 30-50 wt. %. Since metering of dry granular sugar to provide 80 wt. % of the total sweetening agent would yield a dry mix containing 77 wt. % sweetener this is another clear indication that "80 percent by weight" in Example II should have read "8 percent by weight" or "8.0 percent by weight".

SUMMARY OF THE INVENTION

The inventors have developed an energy efficient process for the preparation of sucrose-sweetened instant foamers, creamers and topping bases wherein sucrose represents at least 50 wt. % of the carbohydrates contained in the product. Whereas the predominant part of the 25-70 wt % carbohydrates traditionally formed from maltodextrins and corn syrup solids does not add significantly to the consumer appreciation of the ultimate product, the sucrose clearly does: the powder is sweetened, thus rendering it unnecessary for the consumer to add sugar to the ultimate beverage separately, or at least it reduces the amount of sugar needed to give the beverage its desirable sweet taste. From an environmental and economic perspective, the amount of packaging materials can thus be reduced. It is no longer required to provide sweetening powders in separate packaging, or at least it may provide for smaller packaging.

The present process makes it possible to replace at least part of the carbohydrate fillers normally applied in the aforementioned instant products by equal amounts of sucrose without deteriorating the physical appearance of the product.

In addition, the process enables the preparation of instant products containing high levels of sucrose. Despite the high sucrose content, the powders obtained by the present process exhibit free-flowing behaviour, not hindered by caking effects.

The inventors have found that it is not straightforward to replace large parts of the carbohydrate fraction in existing foamers, creamers and topping bases by sucrose. The more sucrose is added, the more functionality is added to the ultimate powder. However, with increasing sucrose levels sucrose hygroscopicity starts affecting the manufacturing steps to a greater extent. Conventional spray-drying of emulsions to produce instant powders having a high sucrose content was found to be problematic, even when extending the process with additional post-drying steps. Caking introduced with spray-drying was difficult to reverse. It was found by the inventors that the occurrence of caking in the production of high sucrose instant powders by means of spray drying can be minimised very effectively by concurrently (i) injecting at least a substantial part of the sucrose as a dry powder into the drying chamber and (ii) spraying a dispersion containing the remaining ingredients of the instant powder into the same drying chamber; and by ensuring that instant mixing occurs between the sucrose powder and the dispersion. The process according to the invention is reflected in the powder having a substantially amorphous matrix in which sucrose crystallites are embedded. Although the inventors do not wish to be bound by theory it is believed that the instant mixing of the dispersion and the sucrose powder in the drying chamber makes it possible to incorporate a major fraction of the total amount of sucrose via the sucrose powder stream. The sucrose that is introduced in the drying chamber as part of the dispersion ends up in the amorphous matrix of the powder particles whereas the sucrose that is introduced as sucrose powder forms sucrose crystallites that are embedded within this matrix. Thus, the present invention enables the preparation of instant foamers, creamers and topping bases that differ from their conventional counterparts in that a large fraction of the sucrose is contained therein in the form of crystallites.

Instant mixing of the sucrose powder and the dispersion may suitably be achieved by introducing these two components into the drying chamber through one or more dry powder injection (DPI) units. A DPI unit may consist of at least 2 concentric tubes, having a central tube equipped with a spraying nozzle through which the dispersion is pumped, and a mantle or outer tube surrounding the central tube, through which outer tube the powdered sugar is pneumatically transported towards the nozzle, to ensure instantaneous mixing with the dispersion emerging from the nozzle.

The amount of powdered sugar to be injected is metered in such a manner that the desired amount of crystalline sugar is incorporated in the final powder. It is well within the skill of an average skilled person to determine the appropriate spray drying conditions for achieving this.

FIGURES

DETAILED DESCRIPTION OF THE INVENTION

Figure 1A:
FIGS. 1a and 1b show microscopic images of an instant powder according to the present invention.

In one aspect, the invention thus pertains to a powder comprising, based on dry weight:
25-75 wt. % carbohydrates, including at least 50% sucrose by weight of said carbohydrates;
10-70 wt. % fat;
0.4-20 wt. % protein;
wherein the powder particles comprise an amorphous matrix of fat, protein and carbohydrates as well as sucrose crystallites embedded in said amorphous matrix; and wherein at least 40% of the sucrose is present in crystalline form.

According to a particularly preferred embodiment, the present powder is a foamer, a creamer or a topping base. The powder according to the present invention preferably is an instant powder, characterized in that, upon reconstitution in a liquid (e.g. coffee), it provides said liquid with a creamy, foamy and/or whitened appearance; it contains conventional amounts of fat, protein and carbohydrates.

In another aspect, the invention also relates to a process of spray-drying a foamer, creamer or topping base, i.e. a fat-containing composition as described above, comprising: (i) providing a dispersion of the foamer, creamer or topping base ingredients including part of the carbohydrate fraction in a liquid solvent at a concentration between 50 and 75 wt %; providing finely divided sucrose particulate material; (iii) spray drying the dispersion while continuously introducing the finely divided solid sucrose particles into the spray drier in an amount of at least 40 wt %, preferably between 40 and 80 wt %, based on the total weight of carbohydrates in the final product, and optionally postdrying the final product.

Alternatively, the amount of dry free-flowing sucrose added in step (iii) may be calculated between 25-45 wt % of the total amount of dry solids in the final spray-dried product. In a preferred embodiment, 40-80% of all sucrose is added in step (iii) as a dry powder. In such case, it is particularly preferred if sucrose is the sole carbohydrate source in the spray-dried and packaged powder.

The process produces a free-flowing foamer, creamer or topping base consisting of a spray-dried matrix of fat, protein and carbohydrates (including at least part of the total amount of sucrose) bonded to sucrose particles. The powder is to a large extent formed from a substantially spray-dried amorphous matrix bonded to one or more sucrose crystalline domains. These crystalline sucrose particles are thus embedded in the matrix. With the term "substantially spray-dried" it is preferred that at least 80%, more preferably at least 90%, most preferably at least 95 wt % of the matrix is amorphous; it is preferred that at least 40%, more preferably at least 60%, most preferably at least 70% and/or up to 80 wt % of the sucrose is present in crystalline form.

According to a particularly preferred embodiment the instant powders according to the present invention contain at least 35 wt %, more preferably at least 45 wt. % and most preferably at least 50 wt. % sucrose. Typically, the sucrose content of the instant powders does not exceed 75 wt. %.

In accordance with another advantageous embodiment of the present instant powder at least 80 wt. % of the powder particles comprise 40-75 wt. % of the amorphous matrix and 25-60 wt. % of one or more sucrose crystallites embedded in said amorphous matrix. The sucrose crystallites typically have an average diameter of at least 100 μm, more preferably of at least 200 μm and most preferably of at least 250 μm; the average diameter of the sucrose crystallites may typically be smaller than 600 μm, preferably smaller than 500 μm, more preferably smaller than 400 μm.

Foamers, creamers/whiteners and topping bases are all instant powders that are to be reconstituted in a range of water- or milk-based food applications consumed as a liquid or semi-liquid. Examples are mousses, whipped toppings etc. The powder is preferably a matrix containing carbohydrate, protein and fat. The actual amounts of fat, protein and carbohydrates in such a powder, and incorporation of other ingredients (and amounts thereof) is determined by the application. However, these applications all share that the preparation of the foodstuff or beverage involves a step of contacting the fat-containing powder with a liquid, i.e. water and/or milk.

In one embodiment, the fat-containing powder is a foamer. In one embodiment, the fat-containing powder is a creamer. In one embodiment, the fat-containing powder is a topping base.

The moisture content, i.e. water content, of the particulate fat-containing composition, i.e. the foamer, creamer or topping base, is preferably below 5 wt %, more preferably below 4 wt %, more preferably below 3 wt %, based on the total weight of the composition. It is preferably a spray-dried composition. It is preferably a (water-) soluble instant powder. The particulate or powdery properties may be characterized by the poured and/or tapped bulk density. It may have a poured bulk density of 100-700 g/L, and/or a tapped bulk density of 150-800 g/L. The actual bulk density is largely dependent on the food application. The powder may be characterized in terms of its bulk density. "Bulk density" used herein in connection with the foamer, creamer or topping base is determined by measuring the volume that a given weight of the powder occupies when poured through a funnel into a stationary graduated cylinder. For the poured bulk density the above limits are preferably 50 g/l lower.

If the powder is intended as a foamer, it contains a larger volume of gas vacuoles than a creamer, wherein the gas upon dissolution of the powder produces foam. The entrapped gas greatly reduces the bulk densities compared to other food applications. A foamer may preferably be characterized having a tapped bulk density of between 100 and 400 g/L, preferably between 150 and 300 g/L, more preferably between 180 and 250 g/L. The bulk density can be controlled by adjusting the dosage of the injected gas before the spray-drying step.

The poured bulk density of a creamer or topping base preferably ranges between 350 and 650 g/L, more preferably between 400 and 600 g/L, even more preferably between 425 and 550 g/L; the tapped bulk density of a creamer or topping base may be between 450-700 g/L, more preferably 550-650, most preferred is 500-600 g/L.

The carbohydrate fraction of the powder, based on its total weight, is preferably between 25 and 75 wt %, more preferably between 30 and 70 wt %, most preferably at least 35 wt %, particularly at least 40 wt %, especially at least 45 wt %. The carbohydrates function as filler and spray drying aid. It is preferred that at least 50%, more preferably at least 60%, most preferably at least 70%, particularly more than 80%, especially more than 90% of the carbohydrates in the powder is sucrose. The remainder may comprise conventional carbohydrate or carbohydrate mixtures, suitable examples including lactose, maltodextrin (preferably having a DE value of 13 to 20), glucose syrup (preferably having a DE value of 21 to 47), corn syrup, starch, modified starch, cyclodextrin, dextrose, fructose, inulin and/or oligofructose, and the like. Mixtures containing maltodextrin and or corn syrup are particularly preferred. In a most preferred embodiment, the packaged, spray-dried powder does not contain carbohydrates other than sucrose. From a consumer perspective, this is the most attractive embodiment. However, this obviously puts restraints on the manufacturing. The inventors have however proven that this is however feasible using the dry powder injection method as laid down further on in the specification.

The fat content of the present powder preferably lies in the range of 20-68 wt. %, more preferably of 30-66% wt. %. The fat or fats applied in the powder may be of animal or vegetable origin. A preferred animal fat is milk fat. Vegetable fats that may suitably be used include palm oil, palmkernel oil, coconut oil, soybean oil, canola oil and mixtures thereof. The present invention also encompasses the use of fractions (e.g. oleins or stearins) of the aforementioned fats as well as fully or partially hydrogenated versions of these fats.

The protein content of the powder typically lies in the range of 1-12 wt. %. The protein in the matrix may be any suitable protein or protein mixture, of either animal or vegetable origin. Suitable examples include milk proteins (casein or whey, or both), soy proteins, wheat proteins, gelatine, caseinates, and the like. In one embodiment, preferred proteins may be soy proteins, e.g. soy protein isolates and/or soy protein concentrates; wheat protein, especially soluble wheat protein; or egg proteins, preferably egg white protein or egg white albumin. In one embodiment, preferred proteins comprise milk proteins such as casein, caseinate (sodium and/or potassium caseinate); whey proteins, such as whey powder, preferably demineralised and/or delactosed whey powder, whey protein concentrate (WPC), preferably a WPC selected from WPC 30, WPC 35, WPC 60 or WPC 80; and whey protein isolate (WPI, having a protein purity of >90% w/w). Skim milk solids, skim milk powder or milk protein concentrates are also suitable. The milk proteins may be used in any combination of the types mentioned above. A preferred protein embodiment comprises a mixture of skim milk or skim milk solids and whey protein concentrate.

The composition may include an emulsifier, preferably in an amount of about 0.5 to 3 wt % of the powdered composition. If desired, the composition may contain other components such as stabilisers, flowing agents, colours, flavours, aromas, and the like. Suitable stabilisers include dipotassium phosphate and sodium citrate.

A suitable flowing agent is sodium silica aluminate. In one embodiment, the powder contains phosphopeptides.

In addition, a topping base may contain significant amounts of emulsifier(s). It is preferred that at least one emulsifier is present, preferably in an amount of 5-25%, preferably 6-22%, more preferably 8-20%. Emulsifiers can be selected from: Mono- and diglycerides of fatty acids (e.g. glyceryl monostearate, glyceryl distearate), Lactic acid esters of mono- and diglycerides of fatty acids (e.g. glycerolactopalmitaat), Acetic acid esters of mono- and diglycerides of fatty acids, Mono- and diacetyl tartaric acid esters of mono- and diglycerides of fatty acids, PGE (polyglycerolesters), PGMS (propyleenglycol monostearate), SSL (sodium stearoyl lactylate, sucrose-esters. Optional ingredients comprise stabilizers, preferably in amounts up to 2%, and/or hydrocolloids, such as alginate or HPMC (hydroxypropylmethylcellulose), preferably in amounts of 0.01-2% wt.

Powdered foamers and creamers, dairy as well as non-dairy, and (dairy) topping bases are well known in the art and widely used for many years. Typical ingredients for powdered creamers/foamers/topping bases are skimmed milk, (milk) proteins, lipids, carbohydrates, stabilizers, emulsifiers, free flowing agents and modified starches. It is not part of the present invention to amend the traditional recipes—other than by increasing the sucrose content or increasing the sucrose/total carbohydrates ratio—for such foodstuff powders. These instant powders may be added to liquids e.g. beverages in conventional amounts, e.g. between 1-3 wt % for creamers; 3-8% wt for foamers; and 7-25% wt. for topping bases, based on the total weight of the (semi-)liquid foodstuff incorporating the powder, ready for consumption. For each of the encompassed foodstuff applications, the skilled person may find guidance in the preferred ranges of fat, protein and carbohydrates in Table 1.

TABLE 1

Preferred fat, protein and carbohydrate ranges*

|  | Preferred (wt %) | more preferred (wt %) | most preferred (wt %) |
|---|---|---|---|
| Foamer |  |  |  |
| Fat | 10-65 | 15-45 | 20-35 |
| Protein | 4-20 | 5-15 | 6-12 |
| carbohydrate | 25-70 | 35-60 | 40-55 |
| Creamer |  |  |  |
| Fat | 10-65 | 20-55 | 20-45 |
| Protein | 0.5-10 | 0.5-6 | 1-5 |
| carbohydrate | 25-70 | 30-65 | 35-65 |
| Topping base |  |  |  |
| Fat | 10-65 | 20-60 | 30-55 |
| Protein | 0.4-15 | 0.5-12 | 1-9 |
| Carbohydrate | 35-75 | 35-65 | 35-46 |

*Per application, fat, protein and carbohydrate contributions in different columns may be combined with one another; the table does not intend to disclose three isolated embodiments. For instance, a preferred amount of fat in a foamer may be combined with a most preferred protein range, and vice versa. Likewise, a lower limit for a fat content range may be combined with an upper limit of a fat content range in a different column.

The foamers, creamers and/or topping bases may be contained in instant powder foodstuff formulations, such coffee powders, coffee or tea extracts, chocolate powders, and are thus suitable for preparing ready-to-drink beverages. In one aspect, the invention thus also pertains to a water- or milk-based food product containing the composition according to the invention, such as desserts, milkshakes. Preferably, the food product is a liquid or semi-liquid food product, preferably a cold or hot beverage, for example coffee, tea, cappuccino.

It is also an object of the invention to provide single servings containing the fat-containing powder according to the present invention, and/or said powders packaged in an amount that would be suitable for use with a single serving of food or beverage.

In one aspect, the composition is packaged in multiwall paperbags, preferably with a poly-innerliner, or a big bag. In one embodiment, the powder may be used in vending machines. In the above dry powder injection process to obtain the instant powder, it is preferred that the dispersion, preferably (i) an aqueous emulsion containing fat, protein and carbohydrate, is provided with a total dry solids content of between 60-75%, preferably at least 62 wt %, more preferably at least 65 wt %, most preferably at least 68 wt %, particularly at least 70 wt %. At least a part of the total sucrose amount present in the final product may be present in the aqueous emulsion, preferably in amounts of 20-60% of the total sucrose amount in the dried product. The amount of water—or for that matter, the dry solids content—of the dispersion is carefully selected not too high, thus avoiding the need for tedious drying afterwards, but at the same time not too low to maintain the viscosity within reasonable levels during subsequent processing steps.

Also, it is preferred that sucrose is added as a dry powder in an amount of at least 40% of the total amount of carbohydrates to be incorporated into the powder, preferably at least 45%, more preferably at least 50%. However, as a maximum, it is preferred to (ii) provide the dry sucrose in an amount of at most 80 wt %, preferably at most 70 wt %, most preferably at most 65 wt %, of the carbohydrates, as a particulate material to the actual spray-drying step. In a preferred embodiment, the above numbers are based on the total amount of sucrose in the spray-dried product. In such case, it is particularly preferred that the product does not contain any other carbohydrates.

Alternatively, it is preferred that the sucrose added as dry free-flowing solids amounts to 20-45 wt %, more preferably between 25-40 wt % of all solids in the spray-dried product.

For more detail reference is made to WO 02/06538, its contents herein incorporated by reference. The spraying conditions mentioned there can be copied here.

As a finely divided particulate sucrose type to be incorporated in the spray drying step, powdered kitchen sugar or "icing sugar" may used. It may have such free flowing physical properties that it allows handling and transportation in industrial pipelines or tubes. Such a sugar type is available from SuikerUnie, The Netherlands, as "poedersuiker". The particle size of a non-limiting suitable dry sucrose powder can be characterized by having a $d_{10}$ between 140 and 180 microns, a $d_{50}$ between 300 and 380 microns, and a $d_{90}$ between 500 and 600 microns.

After spray drying, a post-drying step may be carried out, preferably using a band filter or mat/grid. The spray drying and post-drying step may be carried out in one machine, a so-called Filtermat type dryer, well known in the art.

The dispersions provided in step (i) may be homogenized to dissolve the water soluble components properly and to emulsify the fat. The order in which the fat, protein, carbohydrates and other ingredients (emulsifiers, stabilisers, buffers etc.) are mixed is not in particular critical however it is practical to first combine the protein, carbohydrate and optional ingredients in an aqueous phase and blend this with the fat. Preferably the fat is heated (melted) to a temperature above 60° C. prior to combining it with the aqueous phase. Preferably the homogenization, which may be a single or double stage homogenization, is carried out at a pressure of 50-200 bar in a first step and 5-75 bar in an optional second step. The homogenization temperature is preferably between 40 and 90° C.

The dispersion provided in step (i) of the present process typically contains, by weight of dry matter:
 0-50 wt. % carbohydrates;
 20-75 wt. % fat;
 1-40 wt. % protein;
 0-20 wt. % other edible ingredients.

In one embodiment, to manufacture a foaming composition, gas is introduced in the dispersion or emulsion, prior to the drying step. The gas may be any food-safe gas, but is preferably selected from carbon dioxide or nitrogen, or mixtures thereof. The bulk density of the dry foaming composition can be controlled by adjusting the pressure of the injected gas before the spray drying step. Alternatively or additionally, a foaming composition can be manufactured wherein the gas is pressurized in a matrix of protein, carbohydrate and/or fat; techniques to achieve such 'enhanced foaming compositions' are apparent to the person skilled in the art.

EXAMPLES

Example 1

Conventional Spray Drying

A creamer was prepared from about 64% carbohydrates (all sucrose, SuikerUnie) and about 2% caseinate, about 30% fat (hardened coconut fat), and about 2% dipotassium phosphate E340ii. Thereto, an emulsion was prepared containing these ingredients, wherein the dry solids content of the emulsion was about 66%. The emulsion was spray-dried using a
Filtermat dryer, wherein the spray was collected as a layer on the mat. Hot air was drawn through the mat for the purposes of drying the material deposited on the mat (grid).

The powder thus obtained had an unacceptable sticky, rubbery appearance and was not a powder but had a cakelike consistency Example 2

Dry Powder Injection

The above creamer was prepared using a 66% dry solids emulsion having the above ingredients and amounts thereof, with the difference that 35% of sucrose (based on total amount of solids in the spray-dried product) [or 35/64=55 wt % of sucrose based on total amount of carbohydrates] was now introduced as a finely divided particulate material into the Filtermat spray dryer, and spray dried together with the emulsion. On the mat a layer of sticky powder was obtained, and hot air drawn through the mat did not improve the drying. In fact, after some time, the mat got blocked and pressure increased to unacceptable levels. The production line had to be stopped and cleansed.

Example 3

Dry Powder Injection—Increased Dry Solids Content

Example 2 was repeated, with the difference that the dry solids content of the emulsion was increased to 72%, and 55% of the sucrose present in the final product was now introduced in the spray drying step as finely divided particulate material. At these levels, a free-flowing dry powder was obtained. No lumping/caking or problems with blocking of the grid was observed. The tapped bulk density was about 640 g/l.

At higher dry solids contents, the viscosity of the emulsion resulted in deteriorated spraying conditions. The conditions of example 3 proved about optimal.

Example 4

Spray-Dried Powder Formulation Vs. Dry Mix

Figure 1B:
Figure 1C:
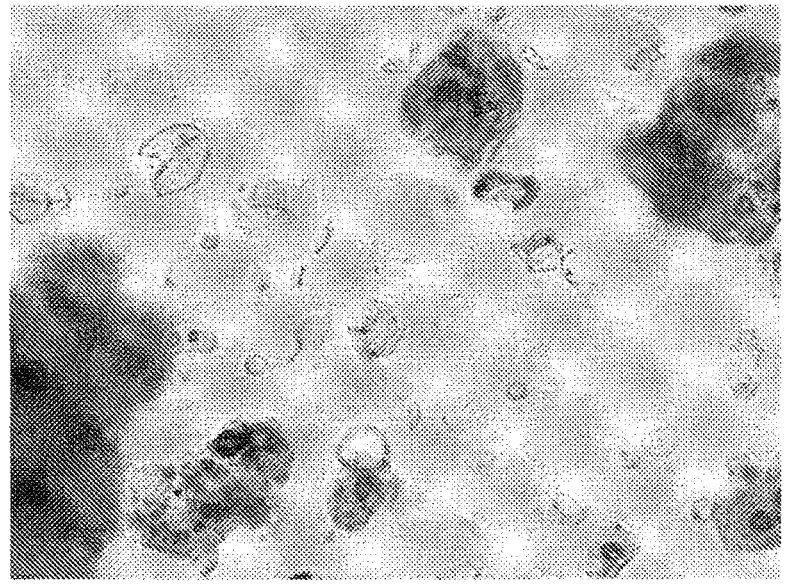
FIGS. 1c and 1d show microscopic images of a dry powder mix of a conventional creamer containing approximately 60% maltodextrin as the sole carbohydrate source.
Figure 1D:
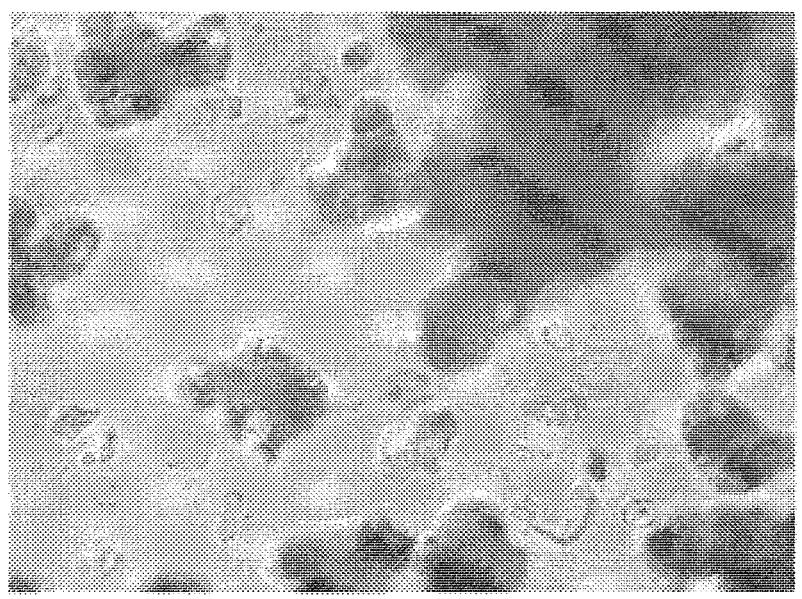

FIGS. 1a and 1b show microscopic pictures of a powder as obtained in example 3. In FIGS. 1c and 1d pictures are shown of a dry powder mix of a conventional creamer containing approximately 60% maltodextrin, as the sole carbohydrate source in the creamer. The creamer was mixed with dry sucrose (60:40). In case of a dry mix, sucrose is predominantly present in free crystalline form, whereas the sucrose comprised in the powder of the invention is largely present embedded in an amorphous matrix.

Example 5

Figure 2A:
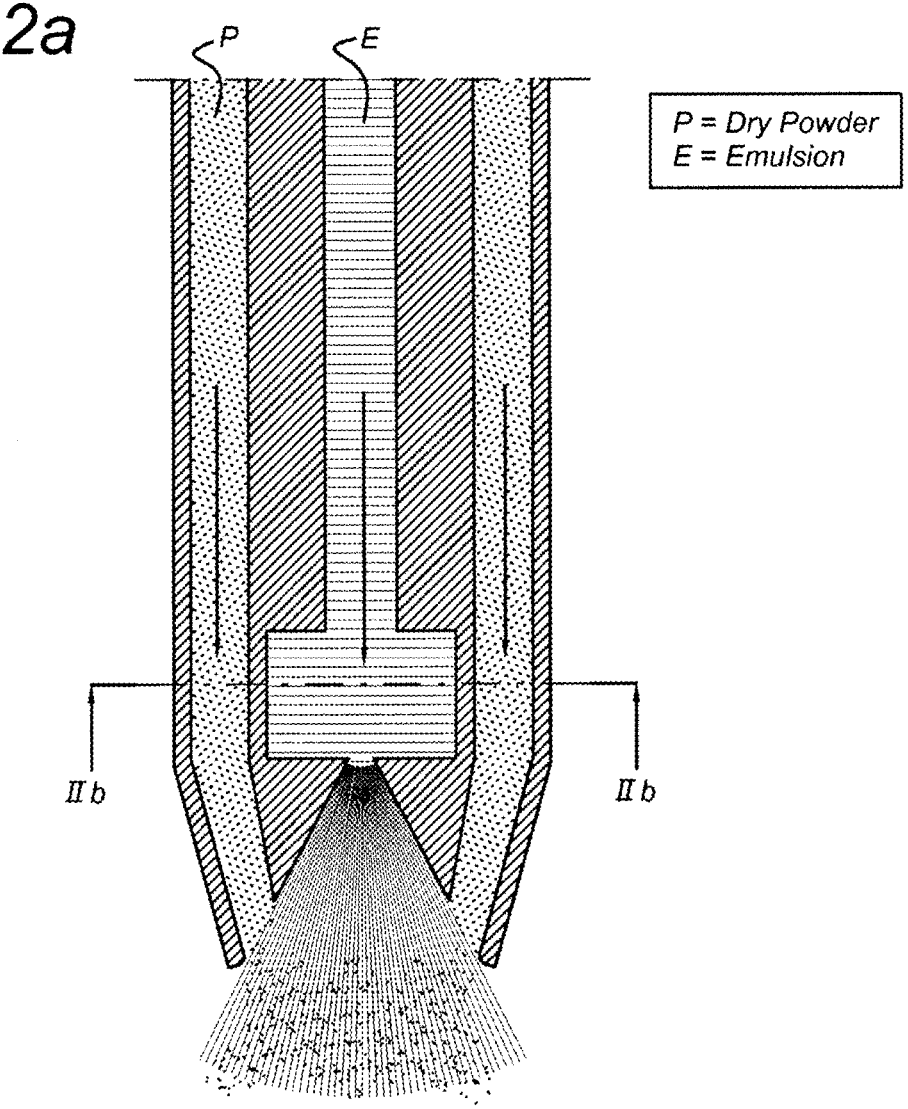
FIGS. 2a and 2b depict a dry powder injection unit that can be used to achieve instant mixing of dispersion and sucrose powder
Figure 2B:
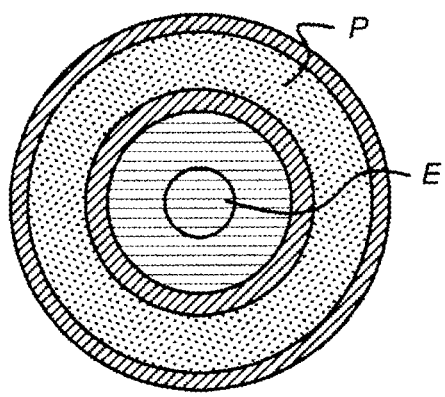
Figure 3A:
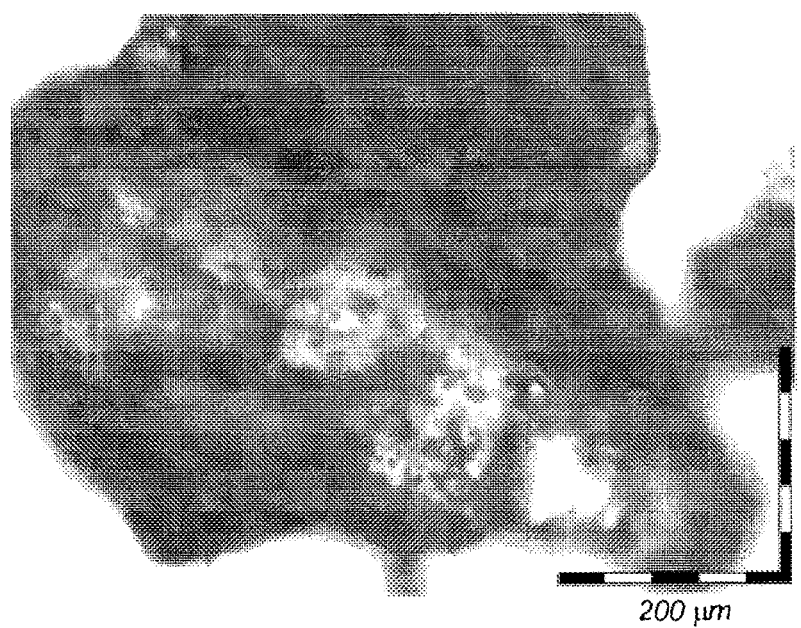
FIGS. 3a and 3b show microscopic images of an instant powder according to the present invention
Figure 3B:
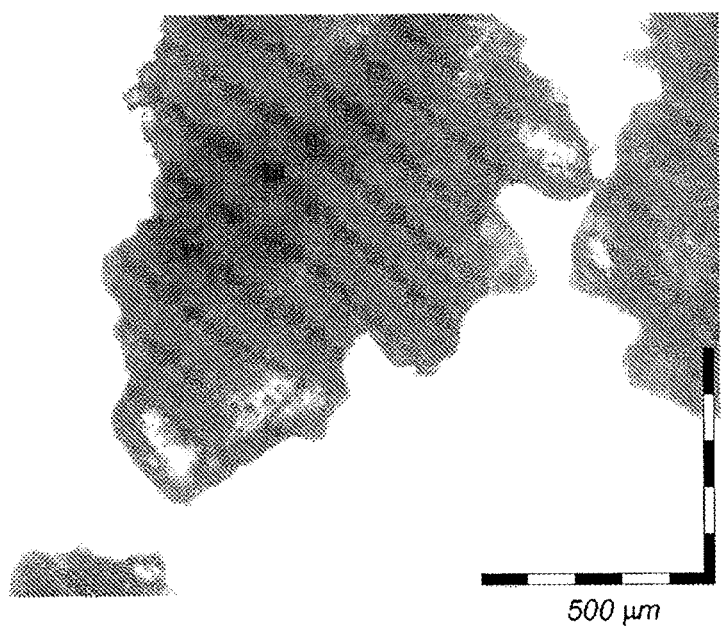

Example 2 was repeated, with the difference that the dry solids content of the emulsion was increased to 72%, and 55% of the sucrose present in the final product was introduced in the spray drying step as finely divided particulate material, using a dry powder injection (DPI) unit as depicted in FIGS. 2a and 2b. FIG. 2a provides a frontal view of a longitudinal cross-section of the DPI-unit. FIG. 2b shows a cross-section of the DPI unit across the line IIb shown in FIG. 2a.

The DPI unit depicted in FIGS. 2a and 2b comprises 2 concentric tubes, having a central tube equipped with a spraying nozzle through which the emulsion is pumped, and an outer tube surrounding the central tube, through which the powdered sugar is pneumatically transported towards the nozzle to ensure instantaneous mixing with the emulsion spray that is emerging from the central nozzle.

The amount of emulsion is metered as well as the amount of sucrose that is introduced into the atomisation spray. The amount of sucrose added is carefully tuned to obtain an end product that meets the required product specification (55% of the sucrose present in the final product is crystalline). The inlet temperature of the spray dryer was set at approximately 160° C., resulting in an outlet temperature of 90-100° C.

A free-flowing dry powder was obtained. No lumping/caking or problems with blocking of the grid was observed. The tapped bulk density was about 640 g/l. Microscope pictures 3a and 3b clearly show the presence of crystalline sucrose particles embedded in an amorphous matrix.

The invention claimed is:

1. A process of preparing a powder, comprising, based on dry weight:
   (i) 25-75 wt. % carbohydrates, wherein at least 50% by weight of the carbohydrates is sucrose, and wherein at least 40% of the sucrose is in crystalline form;
   (ii) 10-70 wt. % fat;
   (iii) 0.4-20 wt. % protein;
   wherein at least 80 wt. % of the powder particles comprises 40-75 wt. % of an amorphous matrix and 25-60 wt. % of one or more sucrose crystallites embedded in the amorphous matrix, the process comprising:
      (a) providing a dispersion comprising fat, carbohydrate, protein and water, and having a dry solids content of 50-75 wt. %;
      (b) providing a finely divided particulate sucrose; and
      (c) introducing the dispersion and the finely divided particulate sucrose into a spray dryer through a dry powder injection unit consisting of at least two concentric tubes having a central tube equipped with a spray nozzle through which the dispersion is pumped and a mantle or outer tube surrounding the central tube, through which outer tube the finely divided particulate sucrose is pneumatically transported towards the nozzle to insure instantaneous mixing with the dispersion emerging from the nozzle, and wherein the particulate sucrose is provided in an amount of at least 40 wt. % based on the total weight of carbohydrates in the final spray dried product.

2. The process according to claim 1, wherein the dispersion comprises 60-75 wt. % dry solids.

3. The process according to claim 2, wherein the dispersion comprises 65-75 wt. % dry solids.

4. The process according to claim 1, wherein sucrose is provided in an amount of at least 50 wt. % by weight of the carbohydrates.

5. The process according to claim 1, wherein sucrose is provided in an amount of at least 50 wt. % by weight of the sucrose contained in the final spray dried product.

6. The process according to claim 1, wherein the finely divided particulate sucrose is continuously introduced into the spray drier in an amount of 50-75 wt. % based on the total weight of carbohydrates in the final spray dried product.

7. The process according to claim 1, wherein the dispersion comprises, by weight of dry matter:
 (a) in an amount of up to 50 wt. % carbohydrates;
 (b) 20-75 wt. % fat;
 (c) 1-40 wt. % protein; and
 (d) 0-20 wt. % other edible ingredients.

8. The process according to claim 1, wherein the finely divided sucrose particulate has a d10 between 140 and 180 μm, a d50 between 300 and 380 μm, and a d90 between 500 and 600 μm.

\* \* \* \* \*